US007386751B2

(12) United States Patent
Cheng et al.

(10) Patent No.: US 7,386,751 B2
(45) Date of Patent: Jun. 10, 2008

(54) GENERIC SERVICE MANAGEMENT SYSTEM

(75) Inventors: Fan-Tien Cheng, Tainan (TW);
Haw-Ching Yang, Tainan (TW);
Chia-Ying Tsai, Tainan (TW)

(73) Assignee: National Cheng Kung University, Tainan (TW)

( * ) Notice: Subject to any disclaimer, the term of this patent is extended or adjusted under 35 U.S.C. 154(b) by 1444 days.

(21) Appl. No.: 10/272,057

(22) Filed: Oct. 16, 2002

(65) Prior Publication Data

US 2003/0135404 A1     Jul. 17, 2003

(30) Foreign Application Priority Data

Jan. 11, 2002  (TW)  ............................... 91100348 A

(51) Int. Cl.
*G06F 11/00* (2006.01)
(52) U.S. Cl. ............................................... 714/1; 705/7
(58) Field of Classification Search ...................... None
See application file for complete search history.

(56) References Cited

U.S. PATENT DOCUMENTS 7,167,909 B2 * 1/2007 Yamamoto .................. 709/223

FOREIGN PATENT DOCUMENTS

| JP | 02-275563 | 11/1990 |
|---|---|---|
| JP | 05-257675 | 10/1993 |
| JP | 08-036502 | 2/1996 |
| JP | 09-016534 | 1/1997 |
| JP | 11-015796 | 1/1999 |
| JP | 11-259326 | 9/1999 |

OTHER PUBLICATIONS

Chen, Qiming; Chundi, Parvathi; Dayal, Umeshwar; Hsu, Meichun. "Dynamic-Agents for Dynamic Service Provisioning". Aug. 22, 1998. Cooperative Information Systems, 1998. Proceedings. 3rd IFCIS International Conference on Cooperative Information Systems. 99 95-104.*

(Continued)

*Primary Examiner*—Tariq R. Hafiz
*Assistant Examiner*—Peter Choi
(74) *Attorney, Agent, or Firm*—Patterson & Sheridan, L.L.P.

(57) ABSTRACT

A generic service management system is disclosed. The generic service management system comprises a registration scheme; a search-and-execution scheme; and a detection-and-replacement scheme, used for detecting and replacing the invalid service provider, such as a semiconductor equipment manager. The present invention provides a GEV (Generic Evaluator) having the capabilities of error-detecting and data backup, and further combines Jini infrastructure and the programming technology of design by contract. The GEV archives the credit values of all the service providers for letting a client (such as a factory manager) to select a service provider having a higher credit value. The GEV periodically backups the execution status and parameters of service providers, so that, in case a service provider has errors, its backup information of execution status and parameters can be assigned to another service provider for continuously executing the unfinished job, thereby enhancing the reliability of distributed object-oriented systems. The present invention can detect abnormal behaviors, such as system crash, errors in transmitting information and degradation of performance, etc., and is suitable for use in production systems that are connected by networks, such as semiconductor manufacturing systems, optical telecommunication production systems, etc.

17 Claims, 11 Drawing Sheets

OTHER PUBLICATIONS

Chen, Qiming; Hsu, Meichun; Dayal, Umeshwar; Griss, Martin. "Multi-Agent Cooperative Dynamic Workflow and XML for E-Commerce Automation". Oct. 1999. Hewlett-Packard Company.*

Griss, Martin L. "My Agent Will Call Your Agent . . . But Will It Respond"?. Dec. 1999. Hewlett-Packard Company.*

Graupner, Sven; Kim, Wooyoung; Sahai, Akhil; Lenkov, Dmitry. "E-Speak—An XML Document Interchange Engine", Sep. 2001. 2nd International Conference on Electronic Commerce and Web Technologies, EC-Web 2001.*

Graupner, Sven; Kim, Wooyoung; Lenkov, Dmitry; Sahai, Akhil. "E-Speak—an Enabling Infrastructure for Web-based E-Services". Jul. 21-Aug. 6, 2000. International Conference on Advances in Infrastructure, Electronic Business, Sicnece, and Education on the Internet.*

Sahai, Akhil; Machiraju, Vijay; Wurster, Klaus. "Monitoring and Controlling Internet based E-Services". 2001. HP Laboratories E-Services Software Research Department.*

Marjanovic, O; Milosevic, Z.; "Towards formal modeling of e-contracts". 2001. Enterprise Distributed Object Computing Conference, 2001. EDOC '01. Proceedings. Fifth IEEE International. pp. 59-68.*

Jennings, N.R; Norman, T.J; Faratin, P.; O'Brien, P.; Odgers, B.; "Autonomous Agents for Business Process Management". Feb. 2000. Applied Artificial Intelligence. vol. 14, No. 2. pp. 145-189.*

Ludwig, Heiko; Hoffner, Yigal; "Contract-Based Cross-Organisational Workflows: THe CrossFlow Project". Feb. 22, 1999. WACC 1999 Workshop: Cross-Organisational Workflow Management and Co-ordination. San Francisco, CA.*

Venners, Bill. "Jini Seminar: Jini's Runtime Infrastructure". accessed at <http://www.artima.com/javaseminars/modules/RuntimeInfrastructure/index.html>. archived Aug. 23, 2000.*

Karp, Alan H. "E-speak E-xplained". Jul. 27, 2000. Hewlett-Packard Laboratories.*

Higashikuni, Hitotora, "Mobile and Wearable Device in the 21st Century", Jun. 29, 2001, pp. 123-129, 1st Edition, Nikkan Kogyo Shimbun Ltd.

* cited by examiner

GENERIC SERVICE MANAGEMENT SYSTEM

FIELD OF THE INVENTION

The present invention relates to a generic service management system, and more particularly, to a generic service management system having the capabilities of error-detecting and function-replacing.

BACKGROUND OF THE INVENTION

With the advent of network age, it has been becoming more and more popular to build software systems based on distributed object-oriented technology. Software system developers have been making great efforts towards the objectives of increasing the reliability of software systems; detecting abnormal service providers; and replacing the abnormal service providers in time with others, such as spare service providers, so as to continuously execute the unfinished job. With the increasing precision and equipment cost in production systems, such as semiconductor production systems, a service provider, such as a semiconductor equipment manager, usually control a plurality of equipment at the same time, and the entire semiconductor manufacturing process is a continuous process. Hence, if the abnormal semiconductor equipment managers are not replaced in time so as to continuously execute the unfinished job from the point right after errors occurring, it will cause huge production loss.

So far, several researchers have reported methods for improving the reliability of individual application software, such as Meyer ("Applying "Design by Contract"", IEEE Computer, vol.25, no.10, pp.40-51, October 1992; "Object-Oriented Software Construction", NJ: Prentice Hall, 1997.) proposed to use the method of design by contract to represent the mutual agreement between clients and service providers, thereby substituting the traditional defensive programming so as to facilitate exception handling and reduce bugs. In the subsequent studies, many researchers applied the concept of contract to the current software development environment, for example using unified modeling language (UML) to describe contracts in the application of object-oriented analysis and design; practicing contracts by Java in the application of Java programs; and applying contracts to the design of framework, etc. Mitchell, Howse and Hamie (R. Mitchell, J. Howse, and A. Hamie, "Contract-Oriented Specifications", IEEE Proceedings of Technology of Object-Oriented Languages, pp.131-140, 1998.) provided a method for converting a specification to a contract, wherein a contract-oriented specification is used to represent the conventional equational specification, and is directly mapped to the method for representing a contract in a program, so that an ordinary specification can be directly converted to a contract. Moreover, several other studies have also developed methods for increasing the reliability and recoverability of application processes. For example, Firstwatch (Veritas, "Veritas First-Watch"), Watchd (Y. Huang and C. Kintala, "Software Implemented Fault Tolerance: Technologies and Experience," in the 23$^{rd}$ International Symposium on Fault-tolerance Computing (FTCS), Toulouse, France, pp.2-10, June 1993.), and Wolfpack (MSCS, "Microsoft NT Server Edition") all provided tools for increasing the reliability of individual application program, but not the overall reliability of a software system built by distributed object-oriented technology.

In the field of increasing the overall reliability and stability of distributed object-oriented systems, Osman and Bargiela (T. Osman and A. Bargiela, "FADI: A Fault Tolerant Environment for Open Distributed Computing," IEE Proceedings of Software, vol.147, no.3, pp.91-99, June 2000.) provided a FADI environment for promoting the execution reliability of the distributed application program, wherein FADI can detect the occurrence of errors by monitoring user-process failures and node crashes, and a non-blocking checkpoint mechanism is provided for recovery operation to retrieve the backup data stored before the occurrence of errors. Although FADI is suitable for use in any distributed object-oriented technologies, yet only processor node crashes and hardware transient failures can be detected, certain faults in the communication link cannot be detected, such as delivering wrong messages, or transmitting messages to wrong nodes, etc. Also, the non-blocking checkpoint police was implemented in FADI to backup and restore the state of the application process before an error occurred. This backup is used when the faulty node is repaired. However, FADI does not prepare spare nodes to replace a faulty one. Therefore, unless the faulty node can be recovered by itself, the system cannot continue to work.

The Jini technology (K. Arnold, B. O'Sullivan, R. W. Scheifler, J. Waldo, and A. Wollrath, The Jini Specification, Addison-Wesley, 1999.) is software to federate groups of service providers. Federation implies a loose coordination among parts, such that service providers may be freely added to or removed from a network. If a service provider is present, it can be used by any interested party. If, however, a service provider terminates unexpectedly, this does not cause any kind of catastrophic failure of the other service providers, but rather removes that service provider from use. Jini provides Discovery, Lookup, Leasing, and Event services. The Discovery service supports Jini's spontaneous community-building capability. The Lookup service enables clients to search for desired service providers. The Leasing service supports Jini's self-healing. However, Jini still requires some functional enhancements to meet the requirements of the desired service management system. These enhancements are described below. Although the Leasing service can be used to detect whether a service provider has crashed, other kinds of abnormal behavior (such as degradation of performance and the delivery of messages with erroneous content) cannot be detected by Leasing. The Lookup service can be applied to search for the desired service providers, but it cannot distinguish levels of confidence among the service providers. Jini does not have a backup scheme to record the execution status and parameters before a failure.

As to the existing patents, U.S. Pat. No. 6,212,649 proposes an intelligent agent to detect whether the message transmitted inside a distributed system is correct, and if the message is incorrect, then the transmitting end is asked to re-transmit the message so as to enhance the system reliability. However, in U.S. Pat. No. 6,212,649, if the member at the receiving end has already had faults, such as system crash, etc., it cannot recover back to normal by itself even when the transmitting end re-transmits the message; and in the distributed object system or environment built in accordance with U.S. Pat. No. 6,212,649, no functions of backup and replacing abnormal members exist, therefore, in case that a service provider in the system is abnormal, the clients cannot freely select another normal service provider in the system to replace the faulty one.

In the other existing patents, U.S. Pat. No. 5,812,757, applied in the operation of motherboard, provides a method for recovering an invalid hardware inside a computer main unit. It is stated that many processing boards exist in a system bus, so that, when one of the processing boards has errors, another processing board will be found to replace the invalid processing board. U.S. Pat. No. 5,502,812, applied in a computer hardware system, proposes a method comprising: implementing one to several backup members on each member of a data processing system; determining if the member in execution is abnormal according to the message sent from the watchdog circuit; and then transferring the job to a backup member for continuous execution. U.S. Pat. No. 6,128,555, applied in a spacecraft technology, proposes a method using software to replace an invalid hardware so as to partially replace the abnormal elements in a spacecraft, so that the spacecraft can accomplish the mission. U.S. Pat. No. 6,122,753, applied in a network transmission technology, proposes a method automatically selecting a less crowded path to replace a faulty path so as to let message transmission continue. U.S. Pat. No. 5,848,229 states how to use a disk array system to make multiple backups for the data stored in a hard disk, thereby promoting the error tolerance for accessing data. However, the aforementioned patents are not designed for increasing the overall reliability of a distributed object-oriented system.

Hence, there is an urgent need to develop a generic service management system having the capabilities of error-detecting and function-replacing, so as to detect and replace an invalid service provider in a system, wherein the unfinished job can be continued from the point where the invalid one left off.

SUMMARY OF THE INVENTION

In view of the aforementioned methods: they can only increase the reliability of each individual application program, but cannot promote the overall reliability of a software system built by distributed object-oriented technologies; unless the abnormal object can be recovered by itself, the system cannot continue to work; when a service provider has an error, the entire execution status and parameters right before the error occurring cannot be transferred to other normal service providers for continuously executing the unfinished mission; when a service provider in a system fails, clients cannot freely select other normal service providers in the system to replace the abnormal one; and they are not designed for increasing the overall reliability of a distributed object-oriented system. Hence, the present invention provides a generic service management system for overcoming the aforementioned disadvantages of the conventional methods.

It is an object of the present invention to provide a generic service management system, thereby effectively detecting abnormal behaviors of service providers, such as system crash, transmitting wrong message and performance degradation, etc.

It is another object of the present invention to provide a generic service management system, thereby selecting a service provider having a higher credit value to replace an invalid service provider.

It is another object of the present invention to provide a generic service management system to backup the execution status and parameters of service providers periodically, so that, when a service provider is abnormal, the unfinished job can be continuously executed from the point where the abnormal one left off, thereby achieving the purpose of increasing the reliability of distributed object-oriented systems.

It is another object of the present invention to provide a generic service management system, so as to be suitable for use in various production systems connected by networks, particularly in various electronic and communication industries, such as semiconductor industry and optical telecommunication industries, etc.

According to the aforementioned objects, the present invention discloses a generic service management system. The generic service management system having the error-handling capability is constructed on a networked distributed system, wherein the networked distributed system comprises: a client; a plurality of service providers; and a community. The community comprising: a lookup service and a generic evaluator (GEV). The generic service management system of the present invention comprises: a registration scheme; a search-and-execution scheme; and a detection-and-replacement scheme. The present invention mainly provides a GEV having the capabilities of error-detecting and data backup, and combines Jini infrastructure and the programming technology of design by contract. The GEV maintains the credit values of all the service providers, thereby enabling the client (such as a factory manager) to select a service provider (such as an equipment manager) having a higher credit value. Moreover, the GEV periodically backup the execution status and parameters of the service providers, so that, when a service provider becomes invalid, the backup execution status and parameters of the faulty service provider can be assigned to another service provider so as to continuously execute the unfinished job.

BRIEF DESCRIPTION OF THE DRAWINGS

The foregoing aspects and many of the attendant advantages of this invention will become more readily appreciated and better understood by reference to the following detailed description, when taken in conjunction with the accompanying drawings, wherein.

DETAILED DESCRIPTION OF THE PREFERRED EMBODIMENT

Figure 1:
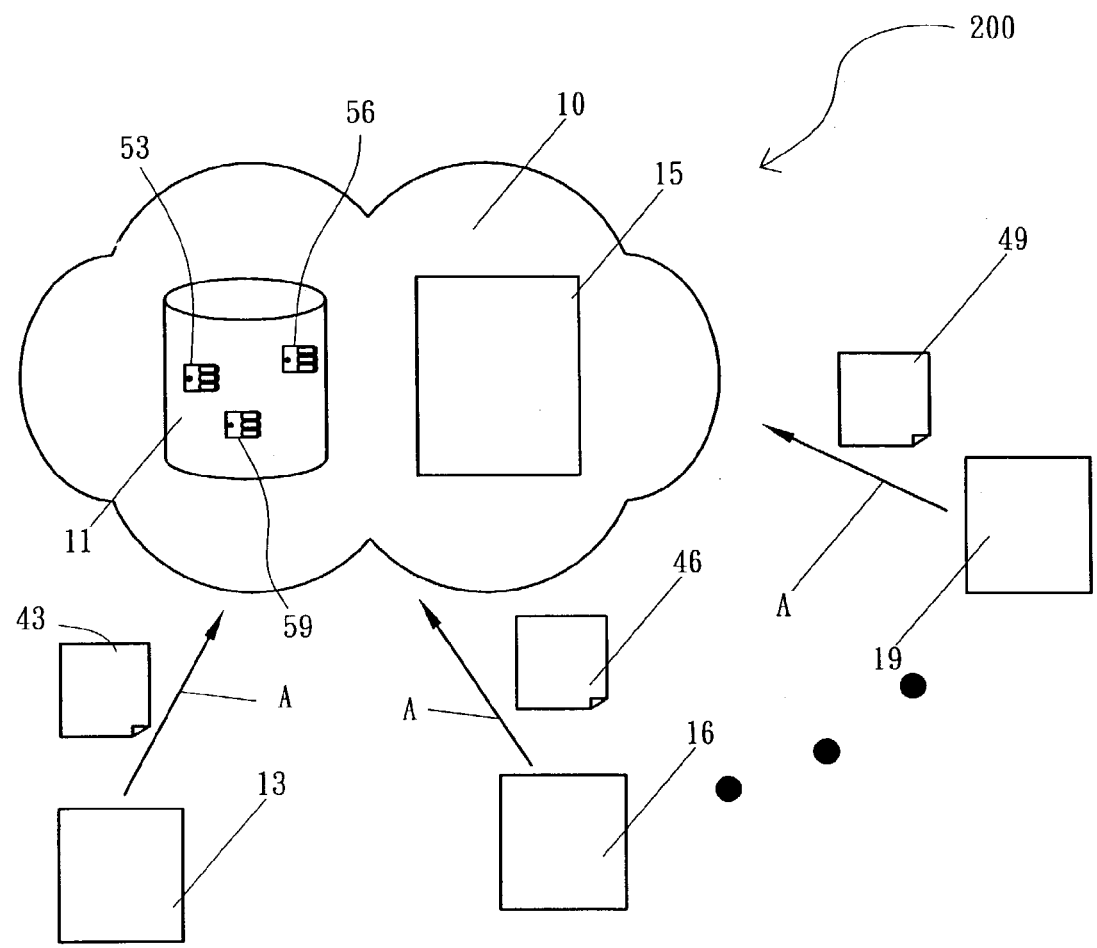
FIG. 1 is a schematic diagram showing the operation of the registration scheme of the generic service management system, according to the present invention.
Figure 2:
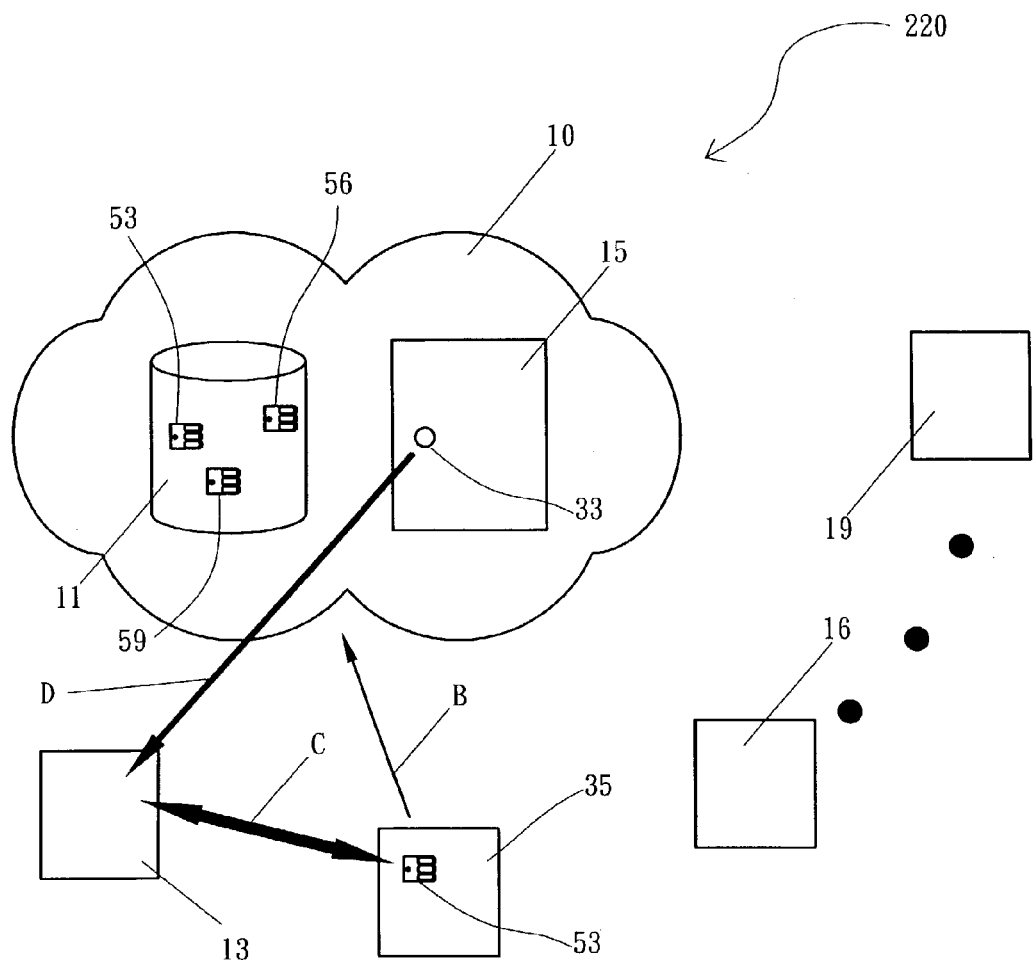
FIG. 2 is a schematic diagram showing the operation of the search-and-execution scheme of the generic service management system, according to the present invention.
Figure 3:
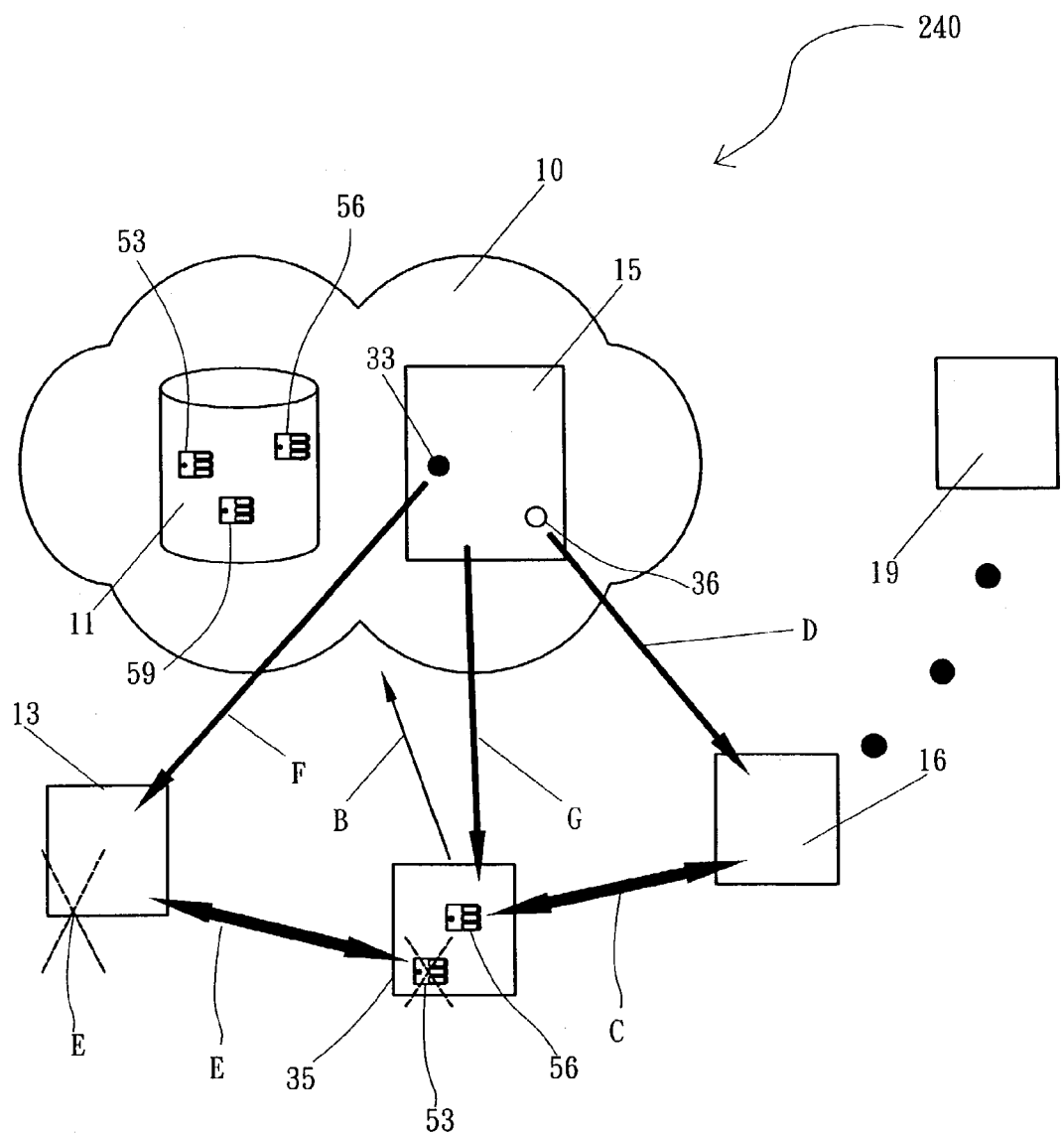
FIG. 3 is a schematic diagram showing the operation of the detection-and-replacement scheme of the generic service management system, according to the present invention.

Referring to FIG. 1, FIG. 2 and FIG. 3, according to the present invention, FIG. 1 is a schematic diagram showing the operation of the registration scheme of the generic service management system; FIG. 2 is a schematic diagram showing the operation of the search-and-execution scheme of the generic service management system; and FIG. 3 is a schematic diagram showing the operation of the detection-and-replacement scheme of the generic service management system. The members of the generic service management system of the present invention are constructed on a networked distributed system, and comprises: a client 35; a plurality of service providers, such as those labeled with no. 13, 16 and 19; and a community 10, wherein the community 10 comprises a lookup service 11 and a GEV 15. The generic service management system of the present invention comprises: a registration scheme 200; a search-and-execution scheme 220; and a detection-and-replacement scheme 240.

In the registration scheme 200 as shown in FIG. 1, the service providers 13, 16 and 19 respectively provide their contracts 43, 46 and 49 to the community 10 (step A), and store their proxies 53, 56 and 59 in the lookup service 11, so as to let the client (not shown) be able to search for an appropriate service provider in the community 10, and request service from the service provider found. In the search-and-execution scheme 220 as shown in FIG. 2, while the client 35 is searching for an appropriate service provider in the community 10, the client 35 may inquire the credit values of the service providers from the GEV 15 in order to select the service provider desired, such as shown in step B of inspecting the contracts and selecting the service provider 13. Thereafter, step C is performed for requesting service from the service provider 13, and a proxy 53 of the service provider 13 is downloaded from the lookup service 11. Meanwhile, the service provider 13 gives its contract items to the GEV 15 for supervision, and sends the execution status and parameters to the GEV 15 for making backup into database. Then, the GEV 15 executes a thread 33 and monitors the service provider 13 (step D). In the detection-and-replacement scheme 240 as shown in FIG. 3, if the service provider 13 has errors, the service provider 13 will become abnormal and be terminated, wherein the proxy 53 will be stopped executing and also be deleted (step E). Meanwhile, the GEV 15 will detect that the service provider 13 is abnormal and notify the client 35. After the errors are detected, the GEV 15 terminates the thread 33 (step F), and sends out warnings (step G), so that the client 35 may search for another service provider in the community 10. After the contracts and credit values are inspected, a service provider 16 is then selected (step B), the client 35 requests service from the service provider 16 (step C), and downloads a proxy 56 of the service provider 16 from the lookup service 11 to replace the abnormal service provider 13, so as to continuously work on the contents of the contract. Meanwhile, the GEV 15 initiates a thread 36 and monitors the service provider 16 (step D).

Figure 4:
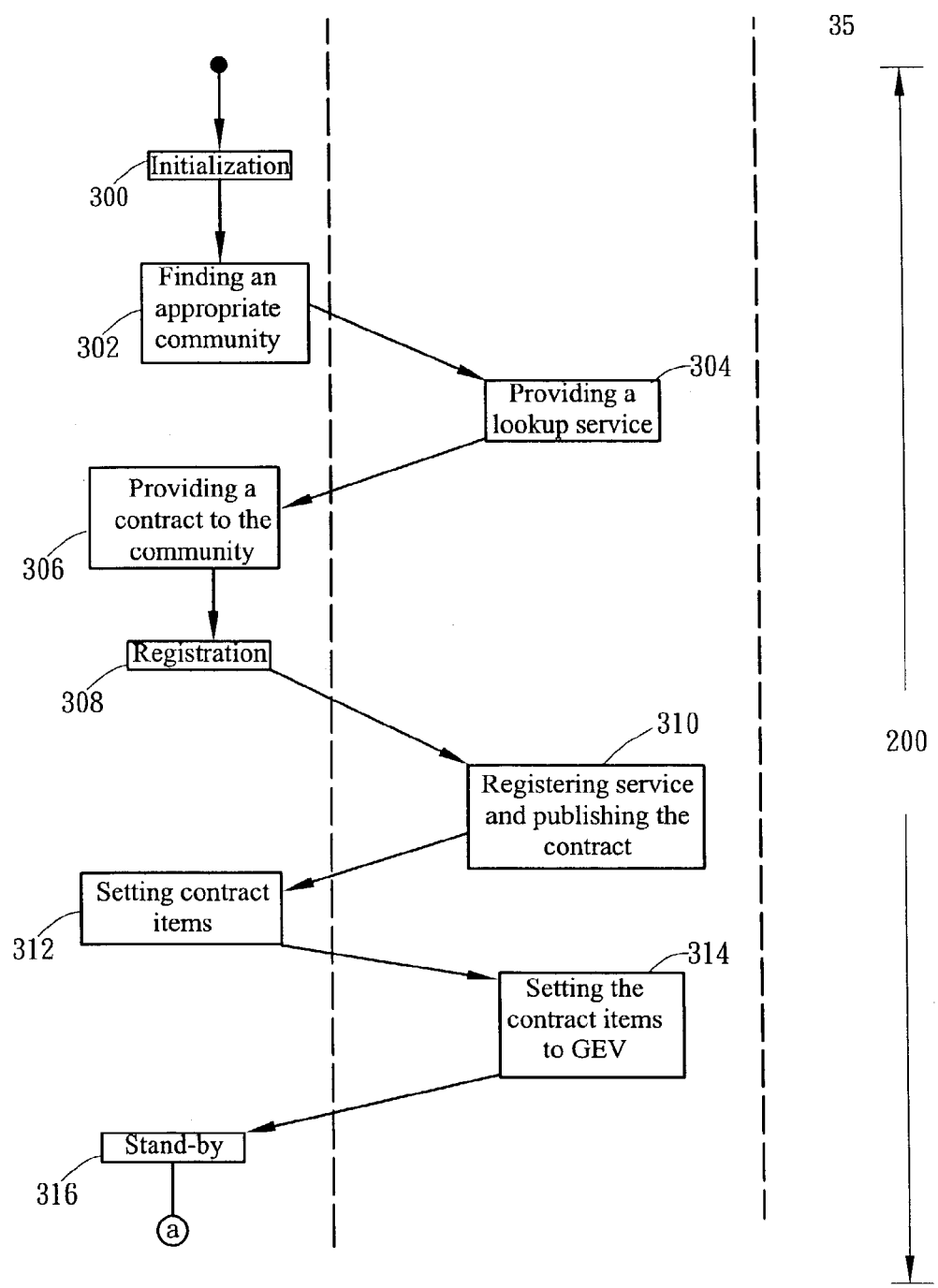
FIG. 4 is an overall flow chart of the generic service management system, according to the present invention.
Figure 4:
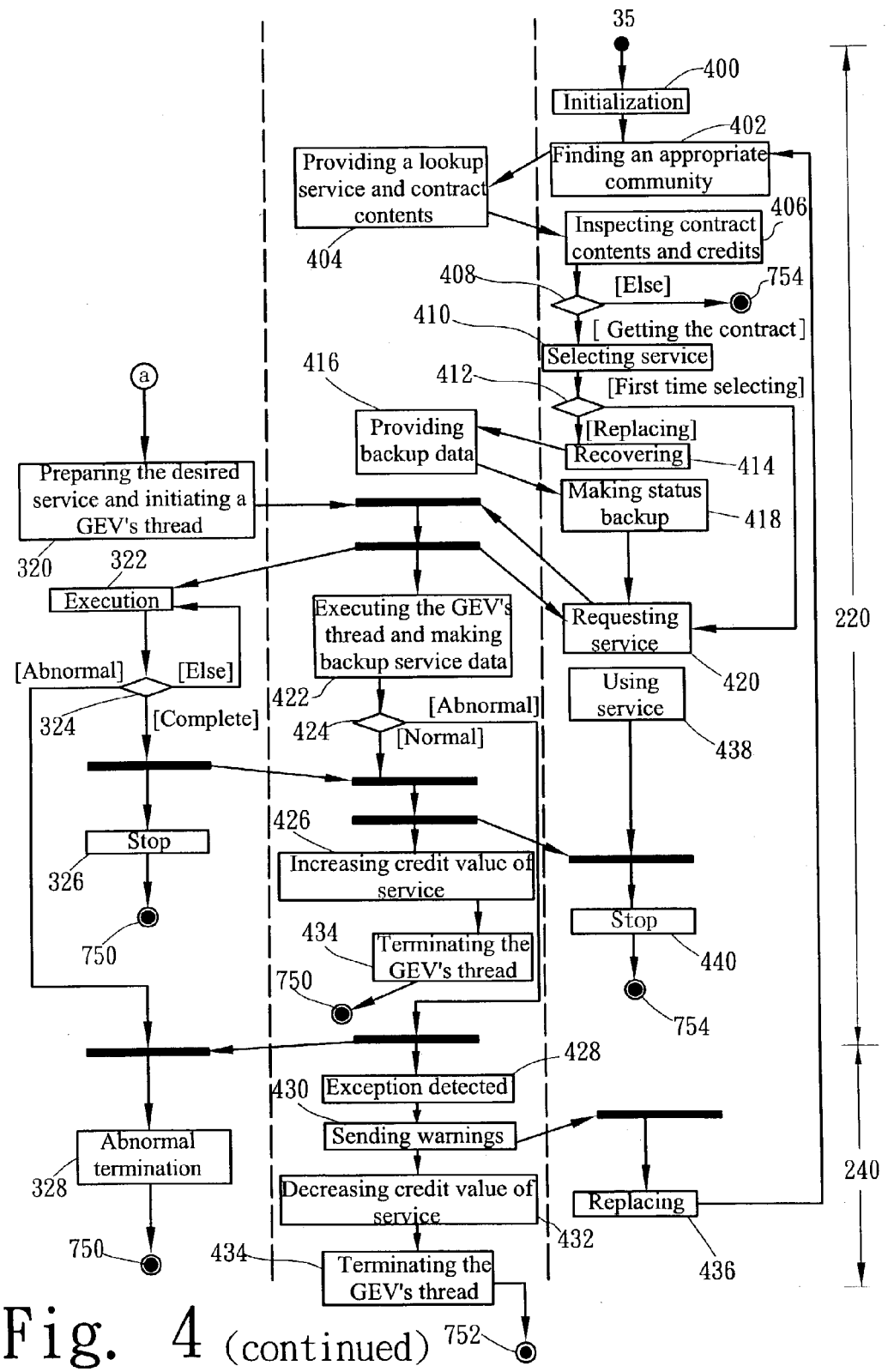

Referring to FIG. 4, FIG. 4 is an overall flow chart of the generic service management system, according to the present invention. Please refer to FIG. 1 and FIG. 4, the flow process of the registration scheme 200 of the present invention is described as follows: After initialization (step 300) of a service provider 13, step 302 is performed for finding an appropriate community. Then, step 304 is performed for searching for a lookup service 11 in a designated community 10 via a Jini's discovery service. Thereafter, step 306 is performed for providing a contract 43 to the lookup service 11 in the community 10, and then step 308 is performed for starting registration. After performing the registration service and publishing the contract (step 310), items of the contract 43 are set (step 312), and set to a GEV 15 (step 314). Then, the GEV 15 assigns a default credit value (such as 0.5) to the service provider 13, and stores the contract items and the credit value into database, so as to monitor the service provider 13. Thereafter, the service provider 13 is in a stand-by state (step 316). Just like the service provider 13, other service providers 16 and 19 also have to go through the aforementioned steps in the registration scheme.

Referring to FIG. 2 and FIG. 4, the search-and-execution scheme 220 of the present invention is described as follows: After initialization of a client 35 (step 400), step 402 is performed for finding an appropriate community. Then, step 404 is performed for providing a lookup service and contract contents. Via the Jini's discovery service, the client 35 searches for the lookup service 11 in the community 10, whereby searching service and contract contents are provided for searching the desired service provider. Thereafter, the client 35 inspects the contract contents and the credit value of each of the service providers (step 406), so as to select an appropriate service provider. Then, step 408 is performed for inspecting if the desired contract is obtained. If the result is no, then step 754 is performed to stop executing the client 35; and if the result is yes, then step 410 is performed for selecting a service provider, for example, after the service provider 13 is selected, a proxy 53 of the service provider 13 is downloaded, so that service can be requested from the service provider 13 via the proxy 53. Then, step 412 is performed for inspecting if it is the first time to select the service provider. If the result of step 412 is yes, step 420 is performed to start requesting service. While the client 35 begins to request service from the service provider 13, the client 35 also enrolls in a GEV 15 for requesting the GEV to inform the client 35 of an event notice if the service provider 13 is abnormal. After the service provider 13 receives a service request, step 320 is preformed for preparing the desired service and initiating a thread 33 of the GEV 15, and thereafter, the service provider 13 is in execution state (step 322). While the client 35 is using service (step 438), the GEV 15 executes its thread 33 and makes backup service data (step 422), wherein the GEV 15 initializes the thread 33 for monitoring the reasonable execution time of the contract items executed by the service provider 13, and periodically making backup of the execution status of the service provider 13 into database. Thereafter, step 424 is performed for inspecting the execution of the service provider 13's contract 43. If the result of step 424 is found that the service behavior of the service provider 13 is normal, the service provider 13 then ends using service (step 440) and stop its execution (step 754), and meanwhile, step 426 is performed by the GEV 15 to increase the service credit value, wherein the GEV 15 increases the credit value of the service provider 13, after the client 35 has finished the service requested. Then, step 434 is performed to terminate the thread 33 of the GEV 15, and the thread 33's execution is stopped (step 750). On the other hand, the client 35 in the state of using service can also be directly stopped using service (step 440) and stopped being executed (step 754).

Please refer to FIG. 3 and FIG. 4, the detection-and-replacement scheme 240 of the present invention is described as follows: If the inspecting result of step 424 is found that the service provider 13's service behavior is abnormal, then the service provider 13 will be terminated abnormally (step 328), and stop executing (step 750). After the GEV 15 detects the abnormal exceptions of the service provider 13 (step 428), the GEV 15 sends out warnings (step 430) to inform the client 35 of the abnormal execution of the service provider 13, and immediately decreases the service credit value of the service provider 13 (step 432). Then, step 434 is performed for terminating the GEV 15's thread 33 monitoring the service provider 13, and step 752 is performed to stop executing the thread 33.

Please continuously refer to FIG. 3 and FIG. 4. After the warnings are sent out (step 430), step 436 is performed for start executing replacement (step 436). After the appropriate community is found (step 402), the client 35 searches for the lookup service 11 in the designated community 10 via the Jini's discovery service (step 404), so as to provide searching service and contract contents for finding a qualified service provider. Thereafter, the client 35 inspects the contract contents and the credit value provided from each of the service providers (step 406), so as to select a service provider therein. Then, step 408 is performed for inspecting if the desired contract is obtained. If the result of step 408 is yes, then step 410 is performed for selecting a service provider, for example, after a service provider 16 is selected by the client 35, a proxy 56 of the service provider 16 is downloaded for requesting service from the service provider 16 via the proxy 56. Then, step 412 is performed for inspecting if it is the first time to select the service provider. If the result of step 412 is no (the result is no while in replacement), step 414 is performed to start recovering procedure. The client 35 provides backup data via the GEV 15 (step 416). The execution status and parameters saved right before errors of the service provider 13 occurring are first retrieved, and then step 418 is performed for setting status backup data. After these execution status and parameters are set to the service provider 16, step 420 is performed for start requesting service from the service provider. While the client 35 begins to request service from the service provider 16, the client 35 also enrolls in a GEV 15 for requesting the GEV 15 to inform the client 35 of an event notice if the service provider 16 is abnormal. After the service provider 16 received a service request, step 320 is preformed for preparing the desired service and actuating a thread 36 of the GEV 15. Thereafter, the GEV 15 executes its thread 36 and makes backup service data (step 422), wherein the GEV 15 initializes the thread 36 for monitoring the reasonable time of the contract items executed by the service provider 16, and making backup of the execution status of the service provider 16 into database. Thereafter, step 424 is performed for inspecting the execution of the service provider 16's contract. If the result of step 424 is found that the service behavior of the service provider 16 is normal, step 426 is performed by the GEV 15 to increase service credit value of the service provider 16, after the client 35 has finished the service requested. Certainly, if the service provider 16 has errors, then the aforementioned steps will be repeated for searching for another service provider to continue the execution of the unfinished job.

Moreover, step 324 is performed for inspecting the execution of the service provider 13 or 16 in the execution state. If the execution is undone yet, the execution of the service provider 13 or 16 will be continued (step 322); if the execution is abnormal, the service provider 13 or 16 will be terminated abnormally (step 328) and its execution will be stopped (step 750); if the execution is finished normally, the client 35 will end using service (step 440) and to stop execution (step 754), and meanwhile, step 426 is performed for asking the GEV 15 to increase the credit value of the service provider 13 or 16, and then step 434 is performed to terminate the thread 33 or 36 of the GEV 15. Thereafter, the execution of the thread 33 or 36 is stopped (step 750), and then the service provider 13 or 16 stops providing service (step 326) and execution (step 750).

The generic service management system of the present invention is featured in using a contract as the mutual agreement between a client and a service provider, wherein the contract is presented by the service provider in a community. While the contract is executed, the service provider will inspect if the client meets the qualification in the contract, and will be self-inspected when the contract is executed. The GEV will monitor the reasonable execution time of the contract items, so as to determine if the service provider has execution errors. The detailed description of the contract will be stated as follows.

Figure 5:
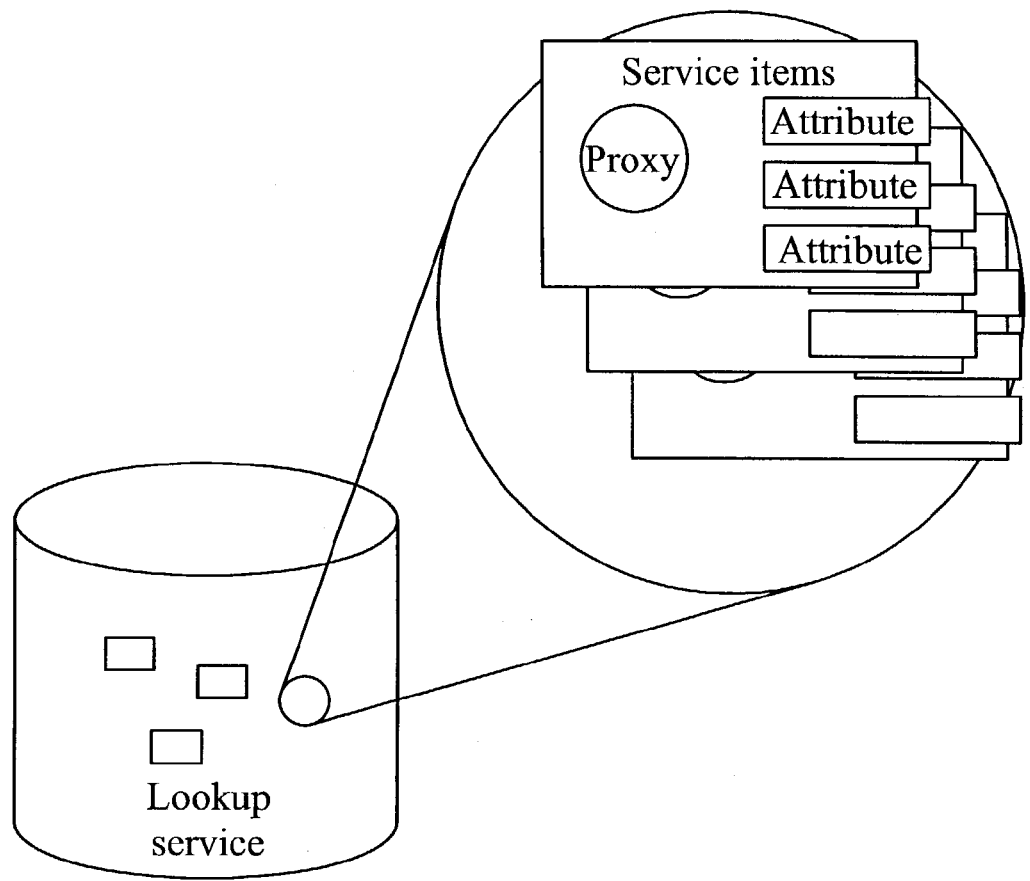
FIG. 5 is a schematic diagram showing the service items maintained in the lookup service of a Jini infrastructure.

Referring to FIG. 5, FIG. 5 is a schematic diagram showing the service items maintained in a lookup service of a Jini infrastructure. In the original Jini infrastructure, the service provider registers its service items provided to a lookup service for enabling the client to search for the service provided by the service provider. Such as shown in FIG. 5, a service item mainly comprises two parts: a proxy and a list of attributes, wherein the proxy is an interface implementation provided by the service provider, and is an object that can be downloaded to the client's end, so that the client can use the service provided by the service provider via the proxy; and the attributes are the description of the service provider itself, whereby the client can find the desired service provider briefly, rapidly and effectively. In the preset invention the contract is equivalent to "proxy" plus "attributes" plus the programming technology of "design by contract". The service provider provides the contract in the community to the client for inquiry. The contract provided by the service provider does not simply indicate the service provided by the service provider, but also includes the regulation mutually complied by the service provider and the client, and is presented by the service provider in the community. The contract herein is the Jini service items comprising the aforementioned concept of design by contract provided by Meyer, wherein the preconditions and post-conditions are added to the original interface defined by Jini. Briefly speaking, the contract is the service provider's interface defined by the method of design by contract, wherein this interface is implemented in the proxy.

In the present invention, the interface provider by the service provider is put into practice by the method of design by contract. Before the client requests the service provider to provide service, the client has to meet the preconditions stated in the contract. After the service provided is completed, the service provider has to guarantee that the post-conditions stated in the contract have been accomplished, thereby assuring the contract fulfillment for the client. The present invention uses the method of proxy to practice the contract in the service provider, wherein the client has to meet the regulation of the contract so as to request the service provider to fulfill the contract contents via the proxy, and in the proxy, to inspect if the client and the service provider itself have fulfilled the contract. By means of the design by contract provided by Meyer and iContract System provided by Kramer, when the client calls the remote service provider via the proxy, if the client does not meet the pre-conditions stated in the contract, the proxy will send exceptions to the client. To sum up, when the service provider of the present invention executes the contract, it is the proxy of the service provider to inspect if the client matches with the contract, and to determine if the service provider has fulfilled the contract correctly.

In order to enhance the detection of the errors of the service provider, the present invention is featured in developing a GEV in the Jini community, so that the client may use the GEV to detect if the desired service provider has errors occurring. Besides, the GEV also periodically making backup of the execution status and parameters of the service provider, thereby providing appropriate backup information and data to the replacement, so that the unfinished job from the service provider having errors can be continued smoothly. Besides the function of detecting, if the service provider has errors, the GEV also records and maintains the credit values of all the service providers, wherein a credit value stands for the service reputation accumulated by a service provider in the community, and is used as the reference for the client to select the service provider. The detailed description of credit is stated as follows.

In the human society, the credit is built by slowly accumulating numerous successes, and yet usually is quickly decreased merely due to one or two times of unfaithfulness. Based on the aforementioned concept, the present invention refers to a publication "Neural Fuzzy Systems" written by Chin-Teng Lin and C. S. George Lee, to derive a credit function for a service provider by modifying the formula stated therein to a curve that is gradually ascending and quickly descending, the credit function being used as the indication of measuring the service provider's reputation.

In the present invention, the credit value of the service provider is maintained by the GEV. The credit value stands for the reputation accumulated by the service provider, and is used as the reference of the client to select a service provider. The credit function of the present invention includes a prize function and a punitive function. When the provider has executed successfully, the GEV increases the credit value of the service provider according to the prize function; and when the service provider has abnormal execution, the GEV lowers the credit value of the service provider according to the punitive function. The credit function for the service provider is written as shown in the following:

Prize function:

$P_i(I) = \mu(I, \lambda_i)$

Punitive function:

$$P_u(I) = \frac{(1+\eta)\mu(I, \lambda_u)}{1 + \eta \cdot \mu(I, \lambda_u)}$$

Wherein $$\mu(I, \lambda) = \frac{1}{1 + e^{-\lambda(I-\gamma)}}$$

Figure 6:
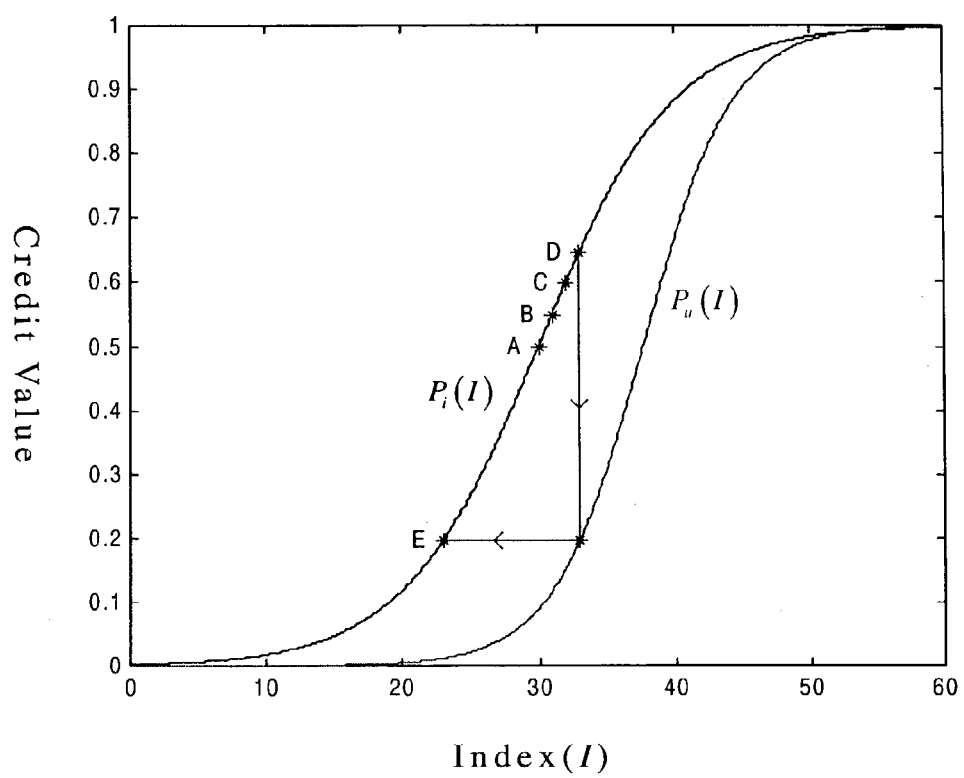
FIG. 6 is a diagram showing the curves of a prize function and a punitive function, according to the present invention.

Symbols Explanation:
$\lambda$=gradient value
$\lambda_i$=gradient value in the prize function
$\lambda_u$=gradient value in the punitive function
.=punitive degree.−1<.<0
I=index value
.=offset of index Referring to FIG. 6, FIG. 6 is a diagram showing the curves of a prize function and a punitive function, according to the present invention, wherein $\lambda_i$=0.2, $\lambda_u$=0.3, .=−0.9, .=30. After the service provider has completed the service requested by the client, the GEV adjusts the credit value of the service provider in accordance with the prize function and the punitive function as shown in FIG. 6. The method for increasing the credit value when the service provider is normal or decreasing the credit value when the service provider is abnormal, is described as follows.

(1) Working normally: Points A, B, C and D are the credit values respectively corresponded to indices that are 30, 31, 32 and 33. Let the original credit value of the service provider be 0.5 (index=30), such as the position of point A shown in FIG. 6, if the client requests service from the service provider and the service has been executed successfully, then the GEV adds 1 to index I, and increases the credit value of the service provider in accordance with the prize function: $P_i(I)$ as shown in FIG. 6, so as to obtain the credit value correspoded to point B in FIG. 6. And so on, after each time of execution success, the GEV will add 1 to index I, and increases the credit value of the service provider in accordacne with the prize function $P_i(I)$, such as shown in FIG. 6, wherein point A to point B; point B to point C; and point C to point D.

(2) Working abnormally: If the service provider has execution errors, a credit value of the service provider is obtained according to the punitive $P_u(I)$ by fixing index I, and then a new index I is obtained by corresponding the credit value to the prize function $P_i(I)$. After the new index I is rounded, and the integer part thereof is taken to obtain the credit value for the next execution, i.e. the integer part of the new index I is used to change the credit value of the service provider, such as the path D to E shown in FIG. 6.

Figure 7:
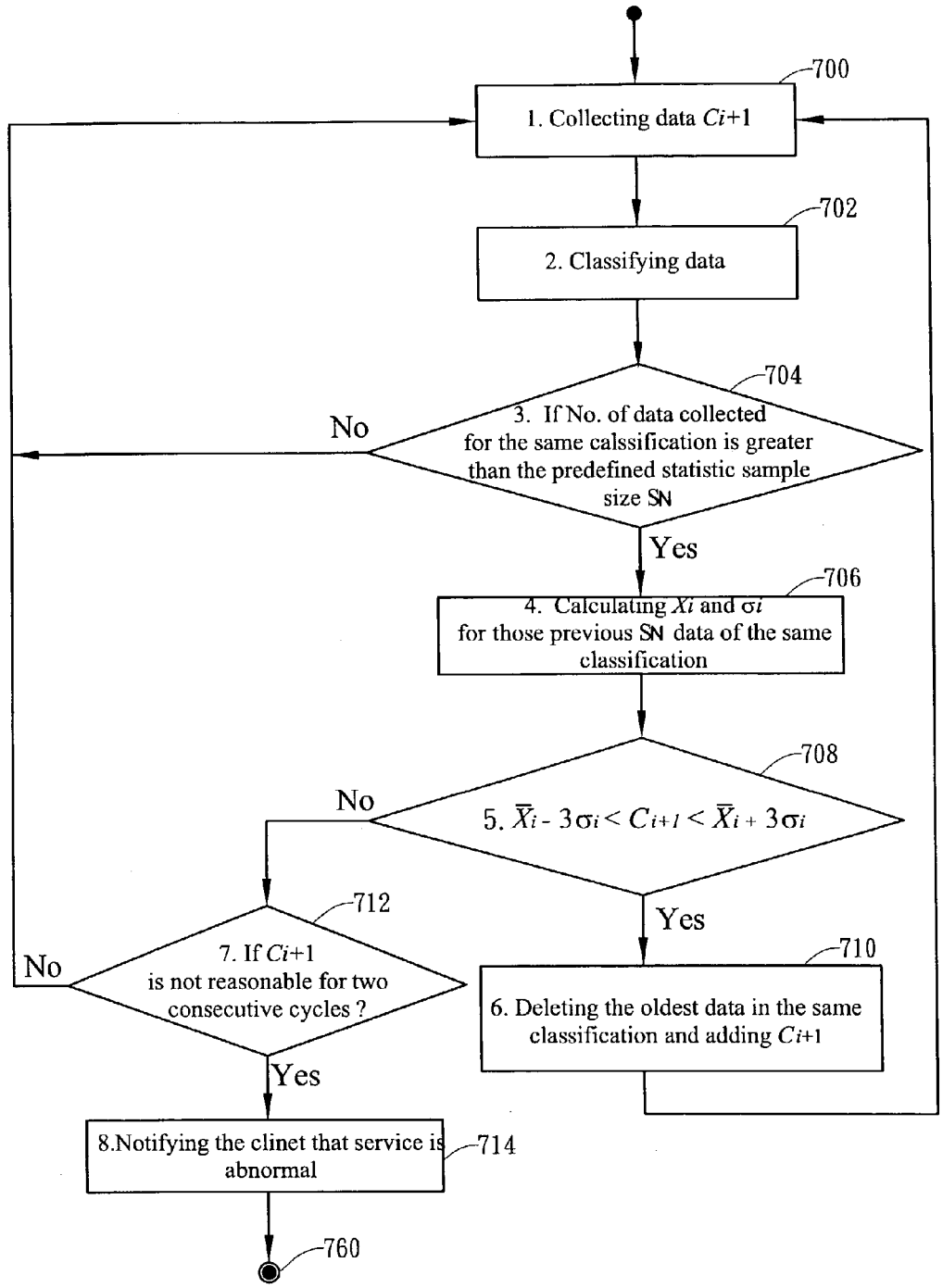
FIG. 7 is a flow chart of a GEV monitoring contract parameters, according to the generic service management system of the present invention.

Moreover, in step 422 shown in FIG. 4, the GEV of the present invention is featured in determining if the service provider is abnormal by monitoring a certain contract parameter, such as the reasonable execution time for which the service provider has executed contract items. After the service provider provide the contract to the community, the service provider set the contract items to the GEV, and then the service provider provides the execution parameters to the GEV, when the client requests service from the service provider, wherein the GEV bases on the contract execution items and parameters to classify the data collected and to calculate the mean value ($\overline{X}_i$) and standard deviation ($\sigma_i$) of each classification, which are used as a base of determining if the service provider is abnormal. Referring to FIG. 7, FIG. 7 is a flow chart of a GEV monitoring contract parameters, according to the generic service management system of the present invention. The steps for performing the function of the GEV monitoring contract parameters are described as follows.

Step 700 is performed for collecting data $C_{i+1}$, wherein for enabling the GEV to monitor the execution of contract. At first, the service provider has to set its contract items to the GEV after joining the Jini community, and after the client requests the service from the service provider, the service provider provides the execution parameters of its contract items to the GEV, and then, the GEV bases on the contract execution items and their parameters to determine if the service provider is abnormal. Thereafter, step 702 is performed for classifying the data, wherein, after collecting a set of new data, the GEV classifies the data in accordacne with the parameters of contract items provided by the service provider. Thereafter, step 704 is performed for determining if the number of data collection for the same classification is greater than the predefined statistic sample size $S_N$, wherein if the result of step 704 is no, then store the data into database, and return to step 700 for continuously collecting data until accumulating enough size of samples. If the result of step 704 is yes, then step 706 is performed for calculating the mean value ($\overline{X}_i$) and standard deviation ($\sigma_i$) of the previous $S_N$ sets of data under the same classification, wherein, when enough size of samples is accumulated, the GEV calculates the mean vlaue and standard deviation of data under the same classification, so as to determine if a certain contract parameter, such as the execution time of a certain contract item, is reasonable. Thereafter, step 708 is performed for determining if $\overline{X}_i - 3\sigma_i < C_{i+1} < \overline{X}_i + 3\sigma_i$ holds, wherein, after the GEV calculates the mean value ($\overline{X}_i$) and standard deviation ($\sigma_i$) of the contract parameters under the same classification, then determine if $C_{i+1}$ falls between $\overline{X}_i-3\sigma_i$ and $\overline{X}_i+3\sigma_i$, and if within this range, then it is determined that this contract parameter of the service provider is reasonable, and if not, then it is indicated that this contract parameter is not reasonable. If the result of step 708 is yes, then step 710 is performed for deleting the oldest data under the same classification and adding $C_{i+1}$, wherein for consistently updating the samples in the database, if the contract parameter, $C_{i+1}$, is reasonable, then the GEV adds the new data to the database and deletes the oldest data under the same classification, and then returns to step 700 for collecting data $C_{i+1}$. If the result of step 708 is no, then step 712 is performed to determine if the contract parameter is not reasonable for two consecutive cycles. If the service provider does not have two consecutive unreasonable contract parameters, then it is likely that this single unreasonable contract parameter is caused by noise, so that the GEV continues to collect new $C_{i+1}$ data. If the contract parameter, $C_{i+1}$, is not reasonable for two consecutive cycles, then the GEV judges that the service provder is abnormal. If the result of step 712 is no, then return to step 700 for collecting data $C_{i+1}$. If the result of step 712 is yes, then step 714 is performed for notifying the client that the service provider is abnormal, wherein if the GEV determines the service provider is abnormal, then the GEV sends an event notice to inform the client that the service provider is abnormal, and then the GEV stops executing (step 760).

The generic service management system of the present invention is suitable for use in various production systems connected by networks, such as the semiconductor manufacturing systems and optical telecommunication production systems, etc. A preferred embodiment applying to an IC packaging plant is described as follows.

Figure 8:
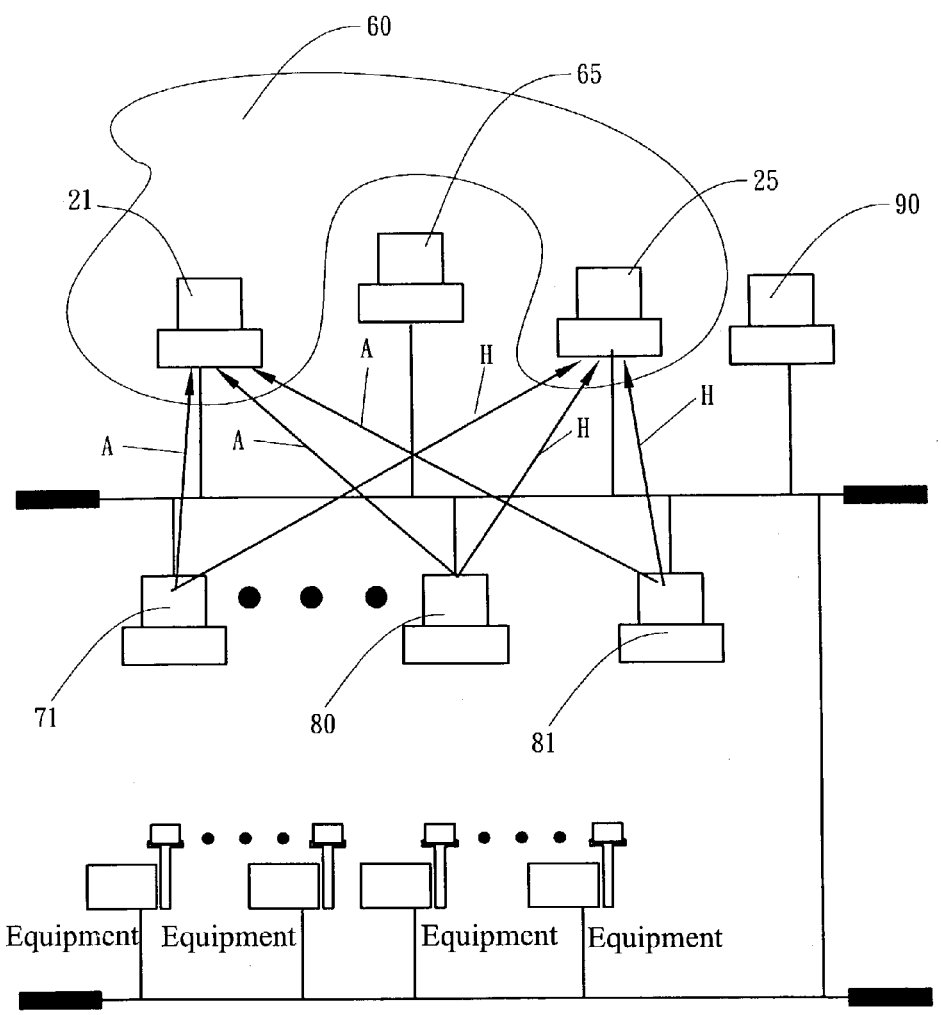
FIG. 8 is a schematic diagram showing the operation of the registration scheme of the generic service management system, according to a preferred embodiment of the present invention.
Figure 9:
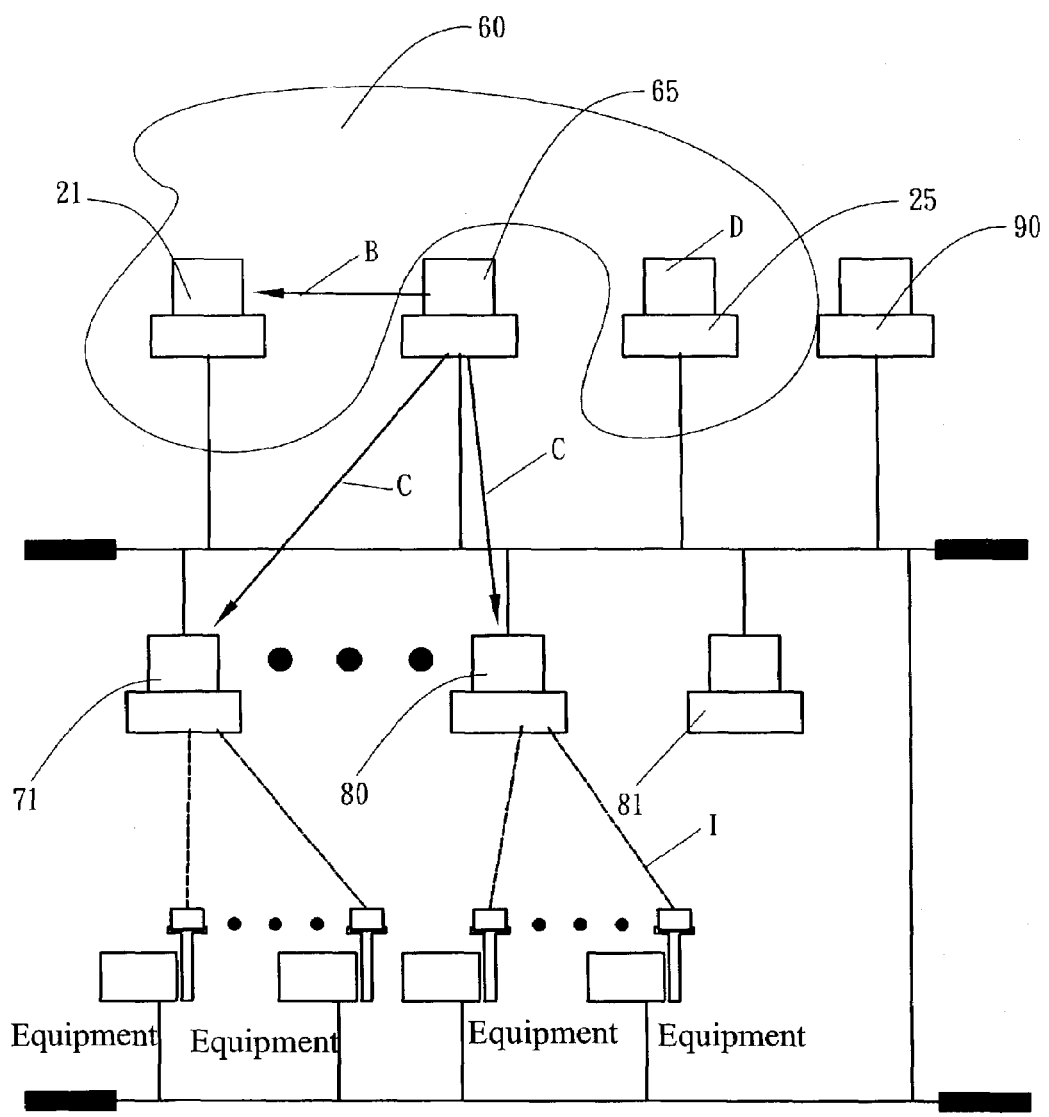
FIG. 9 is a schematic diagram showing the operation of the search-and-execution scheme of the generic service management system, according to the preferred embodiment of the present invention.
Figure 10:
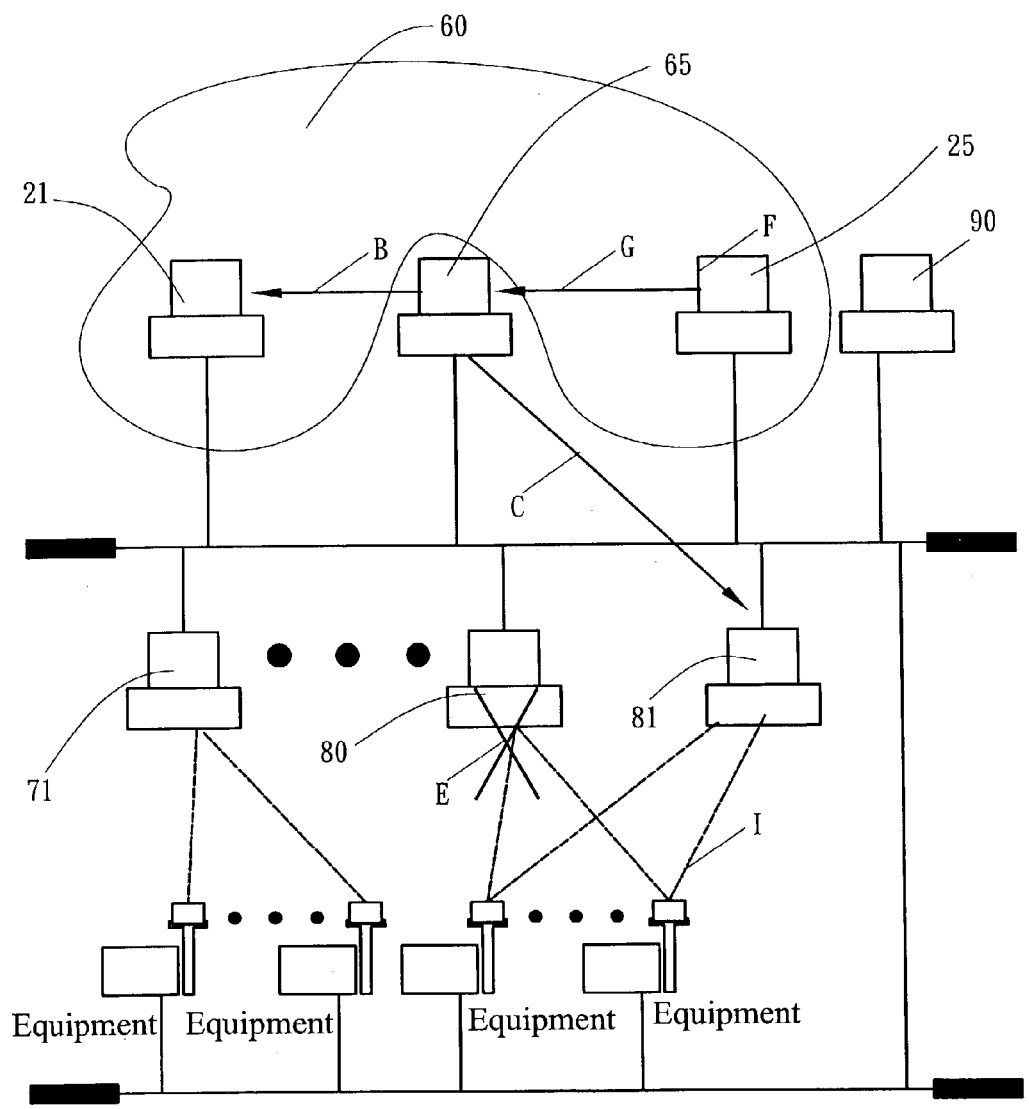
FIG. 10 is a schematic diagram showing the operation of the detection-and-replacement scheme of the generic service management system, according to the preferred embodiment of the present invention.

Referring to FIG. 8, FIG. 9 and FIG. 10, FIG. 8 is a schematic diagram showing the operation of a registration scheme of the generic service management system, according to a preferred embodiment of the present invention; FIG. 9 is a schematic diagram showing the operation of the search-and-execution scheme of the generic service management system, according to the preferred embodiment of the present invention; FIG. 10 is a schematic diagram showing the operation of the detection-and-replacement scheme of the generic service management system, according to the preferred embodiment of the present invention.

A factory manager 65 is in charge of eleven equipment managers 71 to 81. After one of the equipment managers receives commands from the factory manager, the equipment manager distributes the job to the eight pieces of equipment that it controls. If there are eighty pieces of equipment in the entire plant, then merely ten equipment managers are needed under normal situation, and another one is used as a spare one. The factory manager 65 is mainly responsible for assigning the job received to equipment managers. When the designated equipment manager finishes the assigned job, it returns job-done message to the factory manager, wherein the equipment manager mainly monitors and controls the working behavior and status of the equipment, the capabilities thereof including setting equipment parameters and remotely controlling equipment operation; dispatching job to equipment; managing recipes; collecting events and alarms of equipment; and reporting information collected to the factory manager, etc. In the present embodiment, the equipment managers act as service providers in the generic service management system of the present invention, and the factory manager acts as a client therein. When one of the equipment managers fails, the factory manager may search for another normal equipment manager to replace the abnormal equipment manager so as to supervise the equipment to continue the unfinished job left off by the abnormal equipment manager.

The following explanation is stated in accordance with those three major schemes of the generic service management system of the present invention.

Such as the registration scheme shown in FIG. 8, the equipment manager 71 provides a contract to a community 60, and thus the factory manager 65 is able to find the equipment manager 71 in the community 60 and request service from the equipment manager 71. The detailed steps are stated as follows. Via a Jini's discovery service, the equipment managers 71 to 81 search for a lookup service 21 in the community 60, and then provide contracts to the lookup service 21, such as step A of providing a contract. The equipment managers 71 to 81 then set their contract items to a GEV 25, such as step H of setting contract items. The GEV 25 gives each of the equipment managers a default credit value (such as 0.5), and then stores the contract items and credit values into a database 90 for monitoring the equipment managers 71 to 81.

Such as the search-and-execution scheme shown in FIG. 9, the factory manager 65 searches for the equipment managers 71 to 81 in the community 60, and finds the credit values of the equipment managers 71 to 81, therefore selecting the equipment managers 71 to 80 as desired equipment managers and requesting service from them. Meanwhile, the equipment providers give the execution status of the contract items to the GEV 25 for supervision. The detailed steps are explained as follows. Via the Jini's discovery scheme, the factory manager 65 searches for the lookup service 21 in the community 60, and the factory manager 65 obtains each equipment manager's contract provided by the lookup service 21, and each equipment manager's credit value provided by the GEV 25, so as to search for those ten equipment managers meeting its needs, such as shown in step B. Then, the factory manager 65 chooses to request service from the equipment managers 71 to 80, such as shown in step C. Thereafter, each equipment manager is connected to those pieces of equipment belonging thereto, such as shown in step I for actuating connection. Then, the GEV 25 initiates ten threads to monitor, for example, the reasonable execution time of the contract items of the equipment managers 71 to 80, such as shown in step D, and also makes backup of each equipment manager's execution status to the database 90.

Such as the detection-and-replacement scheme shown in FIG. 10, when the equipment manager 80 has errors, the GEV 25 detects the abnormal behavior of the equipment manager 80, and notifies the factory manager 65, so that the factory manager 65 can search for another equipment manager in the community 60 to replace the abnormal equipment manager for continuosly completing the contract contents. The detailed steps are explained as follows. Suppose that the quipment manager 80 has errors while in execution, such as step E. After detecting the errors of the equipment manager 80, the GEV 25 immediately decreases the credit value of the equipment manager 80, and also ends the thread for monitoring the execution of the equipment manager 80, sucah as step F. The GEV 25 notifies the factory manager 65 that the equipment manager 80 is abnormal, scuh as step G. Via the Jini's discovery service, the factory manager 65 searches for the lookup service 21 in the designated community 60, and searches for the desired equioment manager, such as step B. The factory manager 65 selectes the equipment manager 81 and requests serve therefrom, such as step C, and via the GEV 25, the execution status and parameters stored right before the equipment manager 80 having errors are retrieved and set to the equipment manager 81 so as to replace the equipment manager 80. Then, step I is performed for connecting the equipment manager 81 to those pieces of equipment originally controlled by the equipment manager 80, thereby continuing to complete the unfinished job of the equipment manager 80.

It is an advantage of the present invention to provide a generic service management system, which can effectively detect abnormal behaviors of service providers. Besides system crash, the errors detected by the present invention also include message transmission errors or message transmitted to incorrect nodes, and performance degradation, etc. It is another advantage of the present invention to provide a generic service management system, which uses the concept of credit to represent the reputation accumulated by the service providers, so that the client can select a proper service provider to replace an invalid service provider in accordance with the suitability and the credit values. It is another advantage of the present invention to provide a generic service management system having the backup capability, which can backup the execution status and parameters of service providers to a database, so that, when a service provider is abnormal, the backup can be retrieved and set to the selected spare service provider for continuously executing the unfinished job, thereby achieving the purpose of increasing the reliability of distributed object-oriented systems; It is another advantage of the present invention to provide a generic service management system, which is suitable for use in various production systems connected by networks, particularly in various electronic and communication industries, such as semiconductor industry and optical telecommunication industries, etc. To sum up, the generic service management system of the present invention can greatly promote the production efficiency, and reduce the waste of manpower and materials, therefore having high industrial application value.

As is understood by a person skilled in the art, the foregoing preferred embodiments of the present invention are illustrations of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A generic service management system, wherein said generic service management system has the capability of computer error-handling, and is constructed on a networked distributed system, said networked distributed system comprising a client, a plurality of service providers, and a community, said community comprising a lookup service and a generic evaluator (GEV), said generic service management system comprising:
    a memory;
    a registration processor, wherein said registration processor is programmed to:
        provide each of a plurality of contracts from each of said plurality of service providers to said community;
    a search-and-execution processor, wherein said search-and-execution processor is programmed to:
        search said plurality of service providers in said community by said client;
            inquire said plurality of contracts in said lookup service and a plurality of credit values of said plurality of service providers from said GEV;
            select a first service provider having a proper contract and an acceptable credit value, and requesting service from said first service provider, wherein said first service provider is desired by said client;
            give said first contract from said first service provider to said GEV for supervision; and
            give an execution status and a plurality of parameters to said GEV to make a backup periodically thereof into a database; and
    a detection-and-replacement processor, wherein said detection-and-replacement processor is programmed to:
        detect the errors of said first service provider by said GEV and notifying said client;
        provide a second service provider by said client via said lookup service, wherein said second service provider meets said client's requirements and
        set said execution status and said plurality of parameters stored right before said first service provider having errors to said second service provider selected, so that said second service provider can replace said first service provider that is abnormal to continuously complete the contents of said first contract, thereby attaining the objects of error-detecting and function-replacing.

2. The generic service management system of claim 1, wherein said GEV further comprises:
    providing said plurality of credit values of said plurality of service providers desired by said client, thereby letting said client select said first service provider that is appropriate;
    detecting abnormal behaviors of said networked distributed system, such as system crash; transmitting wrong message and degradation of performance, etc.; and
    monitoring the reasonable contract parameters of said plurality of contracts executed by said plurality of service providers, thereby determining if service provider thereof is executed normally or has already had abnormal behaviors.

3. The generic service management system of claim 1, wherein said plurality of contracts comprises: a proxy under a Jini's infrastructure; a plurality of attributes under said Jini's infrastructure; and the programming technology of design by contract, thereby enabling said plurality of contracts not only to indicate the services provided by said plurality of service providers, but also to include the mutual agreement between said client and said plurality of service providers.

4. The generic service management system of claim 1, wherein said GEV further comprises:
    a credit function, comprising:
        a prize function, wherein, when said plurality of service providers have executed successfully, said GEV increases said plurality of credit values for said plurality of service providers according to said prize function; and
        a punitive function, wherein, when said plurality of service providers have abnormal execution, said GEV lowers said plurality of credit values for said plurality of service providers according to said punitive function.

5. The generic service management system of claim 4, wherein the default values of said plurality of credit values are 0.5.

6. The generic service management system of claim 1, wherein said second service provider is a spare service provider.

7. The generic service management system of claim 1, wherein said lookup service is a lookup service under said Jini's infrastructure.

8. A generic service management system, wherein said generic service management system has the capability of computer error-handling, and is constructed on a networked distributed system, said networked distributed system comprising a client, a plurality of service providers, and a community, said community comprising a lookup service and a generic evaluator (GEV), said generic service management system comprising:

a memory:

a registration processor, wherein said registration processor is programmed to:

initialize registration;
   find said community that is appropriate, wherein after said step of initializing registration, each of said plurality of service providers performs said step of finding said community that is appropriate;
   provide said lookup service;
   provide each of a plurality of contracts to said lookup service in said community;
   start registration;
   provide registration service and publishing each of said plurality of contracts;
   set contract items of each of said plurality of contracts;
   set the contract items of said plurality of contracts to said GEV; and
   assign a default value to a credit value of each of said plurality of service providers, and storing the contract items of each of said plurality of contracts and said credit value of each of said plurality of service providers into a database, thereby monitoring each of said plurality of service providers;

a search-and-execution processor, wherein said search-and-execution processor is programmed to:
   initialize searching;
   find said community that is appropriate, wherein after said step of initializing searching, said client performs said step of finding said community that is appropriate;
   provide searching service and contents of each of said plurality of contracts;
   inspect the contents of each of said plurality of contracts and said credit values;
   inspect if at least one desired contract is obtained, and, if the result is no, then stop execution;
   select the service provider, wherein if the result of inspecting if said at least one desired contract is obtained is yes, then said step of selecting the service provider is performed to obtain at least one first service provider;
   download at least one proxy of said at least one first service provider, thereby requesting service from said at least one first service provider via said at least one proxy;
   inspect if it is the first time to select the service provider;
   start requesting service, wherein if the result of said inspecting being the first time to select the service provider is yes, then said step of start requesting service is performed;
   prepare desired service and actuating at least one thread of said GEV, wherein, after said at least one first service provider receives service request, said step of preparing the desired service and actuating said at least one thread of said GEV, is performed;
   execute said at least one thread of said GEV and making backup of service data periodically;
   inspect service provided by said at least one first service provider;
   increase service credit value, wherein, if said step of inspecting the service of said at least one first service provider does not find any error or said least one first service provider has executed successfully, then said step of increasing service credit value is performed to increase said credit value of said at least one first service provider; and
   terminate said at least one thread of said GEV; and a detection-and-replacement processor, wherein said detection-and-replacement processor is programmed to:
   detect exception events, wherein, when said at least one first service provider has errors in execution, said step of detecting exception events is performed;
   send out warnings, wherein, after said step of detecting exception events, said step of sending out warnings is performed;
   reduce service credit value, wherein, after said step of sending out warnings, said step of reducing service credit is performed to decrease said credit value of said at least one first service provider;
   perform said step of terminating said at least one thread of said GEV, after said step of reducing service credit;
   start executing replacement, after said step of sending out warnings, and then returning to said step of initializing searching for repeating said step of said search-and-execution processor to obtain at least one second service provider;
   provide backup data, wherein said client retrieves at least one backup datum saved right before said at least one first service provider having errors; and
   set status backup data, wherein, after said at least one backup datum is set to said at least one second service provider, said step of starting requesting service is performed.

9. The generic service management system of claim 8, wherein said step of setting the contract items of each of said plurality of contracts is to set data to said GEV.

10. The generic service management system of claim 8, wherein said GEV further comprises:

providing said plurality of credit values of said plurality of service providers desired by said client, thereby letting said client select said at least one first service provider that is appropriate;

detecting abnormal behaviors of said networked distributed system, such as system crash; transmitting wrong message and degradation of performance, etc.; and monitoring the reasonable contract parameters of said plurality of contracts executed by said plurality of service providers, thereby determining if service thereof is executed normally or has already had abnormal behaviors.

11. The generic service management system of claim 10, wherein said step of monitoring the reasonable contract parameters of said plurality of contracts executed by said plurality of service providers, further comprises:

collecting data $C_{i+1}$;

classifying said data, wherein, after step of collecting said data, said step of classifying said data is performed and a classification is obtained;

determining if the number of said data collected under said classification is greater than a predefined statistic sample size $S_N$, and if the result thereof is no, then returning to said step of collecting data;

calculating a mean value ($\overline{X}_i$) and a standard deviation ($\sigma_i$) of the previous $S_N$ sets of data under said classification;

determining if $\overline{X}_i - 3\sigma_i < C_{i+1} < \overline{X}_i + 3\sigma_i$ holds;

deleting the oldest data under said classification, wherein if the result of said step of determining if $\overline{X}_i - 3\sigma_i < C_{i+1} < \overline{X}_i + 3\sigma_i$ holds is yes, said step of deleting the oldest data under said classification is performed and said data $C_{i+1}$ is newly added, and then said step of collecting data $C_{i+1}$ is repeated;

determining if the contract parameter $C_{i+1}$ is not reasonable for two consecutive cycles, wherein if the result of determining if $\overline{X}_i-3\sigma_i<C_{i+1}<\overline{X}_i+3\sigma_i$ holds is no, then said step of determining if the contract parameter $C_{i+1}$ is not reasonable for two consecutive cycles is performed, and if the result thereof is no, then said step of collecting data is repeated;

notifying said client, wherein if the result of said step of determining if the contract parameter $C_{i+1}$ is not reasonable for two consecutive cycles is yes, then step of notifying said client is performed; and stopping execution, wherein after said step of notifying said client, said step of stopping execution is performed.

12. The generic service management system of claim 8, wherein said plurality of contracts comprises: a proxy under a Jini's infrastructure; a plurality of attributes under said Jini's infrastructure; and the programming technology of design by contract, thereby enabling said plurality of contracts not only to represent the services provided by said plurality of service providers, but also to include the mutual agreement between said client and said plurality of service providers.

13. The generic service management system of claim 8, wherein said GEV comprises:

a credit function, comprising:

a prize function, wherein, when said plurality of service providers have executed successfully, said GEV increases said plurality of credit values for said plurality of service providers according to said prize function; and a punitive function, wherein, when said plurality of service providers have abnormal execution, said GEV lowers said plurality of credit values for said plurality of service providers according to said punitive function.

14. The generic service management system of claim 13, wherein the default values of said plurality of credit values are 0.5.

15. The generic service management system of claim 8, wherein said at least one second service provider is at least one spare service provider.

16. The generic service management system of claim 8, wherein said step of providing said lookup service is performed by each of said plurality of service providers to search for said lookup service in said community designated via a Jini's discovery service.

17. The generic service management system of claim 8, wherein said lookup service is a lookup service under said Jini's infrastructure.

* * * * *